(12) United States Patent
Zheng et al.

(10) Patent No.: US 11,217,096 B2
(45) Date of Patent: Jan. 4, 2022

(54) TRAFFIC FLOW DYNAMIC GUIDING METHOD BASED ON REGION BLOCK

(71) Applicant: SHANDONG PROVINCIAL COMMUNICATIONS PLANNING AND DESIGN INSTITUTE GROUP CO., LTD., Shandong (CN)

(72) Inventors: Lizhi Zheng, Shandong (CN); Wenbo Ji, Shandong (CN); Yiwu Li, Shandong (CN); Tao Li, Shandong (CN); Xibo Li, Shandong (CN); Bin Hao, Shandong (CN); Zengjin Li, Shandong (CN); Xufei Jiao, Shandong (CN); Jibin Zhu, Shandong (CN)

(73) Assignee: SHANDONG PROVINCIAL COMMUNICATIONS PLANNING AND DESIGN INSTITUTE GROUP CO., LTD., Shandong (CN)

( * ) Notice: Subject to any disclaimer, the term of this patent is extended or adjusted under 35 U.S.C. 154(b) by 0 days.

(21) Appl. No.: 16/965,011

(22) PCT Filed: Apr. 12, 2018

(86) PCT No.: PCT/CN2018/082870
§ 371 (c)(1),
(2) Date: Jul. 26, 2020

(87) PCT Pub. No.: WO2019/144510
PCT Pub. Date: Aug. 1, 2019

(65) Prior Publication Data
US 2021/0056845 A1 Feb. 25, 2021

(30) Foreign Application Priority Data
Jan. 26, 2018 (CN) .......................... 201810077217.0

(51) Int. Cl.
*G08G 1/0967* (2006.01)
*H04W 4/44* (2018.01)
(Continued)

(52) U.S. Cl.
CPC . *G08G 1/096791* (2013.01); *G08G 1/096775* (2013.01); *G08G 1/161* (2013.01);
(Continued)

(58) Field of Classification Search
CPC ....... G08G 1/096791; G08G 1/096775; G08G 1/161; G08G 1/164; H04W 4/464; H04W 4/44; H04W 76/10; H04L 67/10
See application file for complete search history.

(56) References Cited

U.S. PATENT DOCUMENTS 9,111,453 B1 * 8/2015 Alselimi ................. G01S 19/14
9,478,136 B2 * 10/2016 Lehner .................. B60W 30/09
(Continued)

FOREIGN PATENT DOCUMENTS

CN 204390492 U * 6/2015
CN 104781865 7/2015
(Continued)

OTHER PUBLICATIONS

"International Search Report (Form PCT/ISA/210) of PCT/CN2018/082870", dated Sep. 10, 2018, with English translation thereof, pp. 1-4.

*Primary Examiner* — Chico A Foxx
(74) *Attorney, Agent, or Firm* — JCIP Global Inc.

(57) ABSTRACT

A traffic flow dynamic guiding method based on a region block includes: building communication connection with a cloud server by a vehicle-mounted terminal; performing data acquisition by the vehicle-mounted terminal, and uploading acquired data to the cloud server; receiving feedback of the cloud server by the vehicle-mounted terminal which is
(Continued)

including an accident occurring probability of a current automobile in a set range of a current road section; sending the probability to a driver in a human-computer interaction mode; receiving communication addresses, sent by the cloud server, of the surrounding vehicle-mounted terminals in the set range by the current vehicle-mounted terminal in order to build a connection relationship with the surrounding vehicle-mounted terminals; performing running and updating after the region block relationship is built; performing traffic flow guiding on traffic accident information and performing traffic flow guiding on official vehicles by using the region block relationship.

8 Claims, 4 Drawing Sheets

(51) Int. Cl.
    *H04W 76/10*     (2018.01)
    *H04W 4/46*     (2018.01)
    *G08G 1/16*     (2006.01)
    *H04L 29/08*     (2006.01)

(52) U.S. Cl.
    CPC ............ *G08G 1/164* (2013.01); *H04W 4/44* (2018.02); *H04W 4/46* (2018.02); *H04W 76/10* (2018.02); *H04L 67/10* (2013.01)

(56) References Cited

U.S. PATENT DOCUMENTS

| | | | | |
|---|---|---|---|---|
| 10,156,848 | B1* | 12/2018 | Konrardy | B60R 16/0234 |
| 10,460,534 | B1* | 10/2019 | Brandmaier | G07C 5/008 |
| 10,579,070 | B1* | 3/2020 | Konrardy | B60W 10/04 |
| 10,843,705 | B2* | 11/2020 | Maus | G06N 5/046 |
| 10,967,859 | B2* | 4/2021 | Mizuno | B60W 30/16 |
| 2008/0167774 | A1* | 7/2008 | Patel | G08G 1/20 701/36 |
| 2010/0302974 | A1* | 12/2010 | Niiyama | G07C 5/0808 370/254 |
| 2012/0016627 | A1* | 1/2012 | Nagura | G08G 1/161 702/150 |
| 2012/0146812 | A1* | 6/2012 | Ruy | G08G 1/164 340/905 |
| 2014/0049406 | A1* | 2/2014 | Shin | G08G 1/096716 340/905 |
| 2014/0236462 | A1* | 8/2014 | Healey | G08G 1/096827 701/117 |
| 2015/0025787 | A1* | 1/2015 | Lehner | B60Q 9/008 701/301 |
| 2015/0088335 | A1* | 3/2015 | Lambert | H04L 67/10 701/1 |
| 2016/0275796 | A1* | 9/2016 | Kim | G08G 1/166 |
| 2016/0277911 | A1* | 9/2016 | Kang | H04B 1/3822 |
| 2016/0321924 | A1* | 11/2016 | Lewis | B60W 30/02 |
| 2017/0039668 | A1* | 2/2017 | Luke | G06Q 10/06 |
| 2017/0122841 | A1* | 5/2017 | Dudar | B60W 40/02 |
| 2017/0230803 | A1* | 8/2017 | Calabuig Gaspar | H04W 4/12 |
| 2017/0316685 | A1* | 11/2017 | Yun | G08G 1/162 |
| 2018/0025430 | A1* | 1/2018 | Perl | G07C 5/008 705/4 |
| 2018/0124631 | A1* | 5/2018 | Ramos de Azevedo | H04W 36/32 |
| 2018/0137763 | A1* | 5/2018 | Deragarden et al. | B60W 10/18 |
| 2018/0211546 | A1* | 7/2018 | Smartt | G05D 1/0088 |
| 2018/0286235 | A1* | 10/2018 | Fujisawa | G08G 1/0116 |
| 2019/0066497 | A1* | 2/2019 | Cho | H04W 4/38 |
| 2019/0163176 | A1* | 5/2019 | Wang | G05D 1/0061 |
| 2019/0196501 | A1* | 6/2019 | Lesher | G05D 1/0289 |
| 2020/0035103 | A1* | 1/2020 | Siboni | G08G 1/005 |

FOREIGN PATENT DOCUMENTS

| | | | |
|---|---|---|---|
| CN | 105243840 | | 1/2016 |
| CN | 105489037 A | * | 4/2016 |
| CN | 105679097 | | 6/2016 |
| CN | 206684953 | | 11/2017 |
| EP | 1788749 | | 5/2007 |

\* cited by examiner

TRAFFIC FLOW DYNAMIC GUIDING METHOD BASED ON REGION BLOCK

CROSS-REFERENCE TO RELATED APPLICATION

This application is a 371 of international application of PCT application serial no. PCT/CN2018/082870, filed on Apr. 12, 2018, which claims the priority benefit of China application no. 201810077217.0, filed on Jan. 26, 2018. The entirety of each of the above mentioned patent applications is hereby incorporated by reference herein and made a part of this specification.

BACKGROUND

Technical Field

The present invention relates to the technical field of road traffic safety monitoring and danger early warning, and more particularly to a traffic flow dynamic guiding method based on a region block.

Related Art

At present, the field of dynamic traffic organization and traffic diversion are basically blank. Various existing maps have a real-time road condition function which is mainly used to display existing traffic congestion road sections, drivers to pass through the road sections select appropriate driving paths according to the road condition information of the congestion road sections, and the traffic organization and diversion are realized in this indirect process. In a reconstruction and extension period of an expressway, traffic organization and diversion are mainly achieved by setting information such as signs and sign boards in advance to inform the drivers of forward construction behaviors and road condition information to induce the drivers to select appropriate paths, or traffic diversion is achieved by compulsory measures such as passing restriction in key nodes. The measure consumes time, labor and a great number of social resources, is palliative, and has certain restrictions on the traffic transportation dispersion function.

SUMMARY

The objectives of the present invention are to fill the blanks of driving safety and danger early warning in the field of traffic, enable driving behaviors to be safer, enable dangers to occur to be more predictable, enable traffic organization and traffic smoothness guarantee, for example, in the reconstruction and extension period of the expressway to realize better real-time performance and dynamic performance at the same time, achieve the purposes of saving social manpower and material resources to achieve traffic organization and distribution, and ensure the minimum influence on the society.

In order to achieve the above objectives, the present invention adopts the following technical solution:

A traffic flow dynamic guiding method based on a region block includes:

step (101): building communication connection with a cloud server by a vehicle-mounted terminal;

step (102): performing data acquisition by the vehicle-mounted terminal, and uploading acquired data to the cloud server after processing;

step (103): receiving feedback of the cloud server by the vehicle-mounted terminal, where the feedback includes an accident occurring probability of a current automobile in a set range of a current road section;

step (104): after the vehicle-mounted terminal receives the accident occurring probability of the current automobile in the set range of the current road section, judging whether the probability exceeds a threshold or not; if the probability exceeds the threshold, sending the probability to a driver in a human-computer interaction mode;

step (105): building a region block relationship: receiving communication addresses, sent by the cloud server, of the surrounding vehicle-mounted terminals in the set range by the current vehicle-mounted terminal, and building a connection relationship with the surrounding vehicle-mounted terminals through the communication addresses by the current vehicle-mounted terminal;

step (106): performing running after the region block relationship is built: broadcasting a self position, speed, acceleration or driving behavior safety coefficient to the surrounding vehicle-mounted terminals by the current vehicle-mounted terminal, and identically, also transmitting driving data of the surrounding vehicle-mounted terminals to the current vehicle-mounted terminal;

step (107): updating the region block relationship: after relative positions of the current vehicle-mounted terminal and the surrounding vehicle-mounted terminals are changed, updating self driving data and the driving data of the surrounding vehicle-mounted terminals by the current vehicle-mounted terminal;

step (108): performing traffic flow guiding on traffic accident information by using the region block relationship; and step (109): performing traffic flow guiding on official vehicles by using the region block relationship.

The steps of step (101) are:
starting the vehicle-mounted terminal; building the communication connection with the cloud server by the vehicle-mounted terminal; and sending a self communication address to the cloud server by the vehicle-mounted terminal.

The steps of step (102) are:
after the vehicle-mounted terminal enters a road network, positioning self position coordinates by the vehicle-mounted terminal; calculating the self position, speed, acceleration or direction by the vehicle-mounted terminal by using the position coordinates and time; and uploading data obtained through calculation to the cloud server.

The steps of step (105) are:
receiving a driving danger coefficient of a current vehicle sent by the cloud server, and an accident occurring probability warning given according to a current driving speed, current road conditions or current vehicle conditions by the vehicle-mounted terminal; and sending warning information to the driver in a human-computer interaction mode.

The steps of step (106) are:
in a running process of the current vehicle-mounted terminal at a normal speed, if a front vehicle decelerates, after the current vehicle-mounted terminal receives driving data of a vehicle-mounted terminal of the front vehicle, calculating a relative position distance of the two vehicles in a safe time by the current vehicle-mounted terminal according to the positions, speeds and accelerations of the two vehicles, and judging whether influence is formed or not; if the influence is formed, immediately transmitting warning information to the driver by the current vehicle-mounted terminal; meanwhile, sending the warning information to the vehicle-mounted terminal of the front vehicle; and transmitting information obtained by self judgment and the received warning information to the self driver by the vehicle-mounted terminal of the front vehicle after combination;

in the running process of the current vehicle-mounted terminal at the normal speed, if the front vehicle changes lanes, after the current vehicle-mounted terminal receives driving data of the vehicle-mounted terminal of the front vehicle, calculating a relative position distance of the two vehicles in a safe time by the current vehicle-mounted terminal according to the positions, speeds and accelerations of the two vehicles, and judging whether influence is formed or not; if the influence is formed, sending information of paying attention to lane change of the front vehicle to the driver; and meanwhile, sending reminding information of paying attention to safety driving to the vehicle-mounted terminal of the front vehicle by the current vehicle-mounted terminal;

in the running process of the current vehicle-mounted terminal at the normal speed, if a rear vehicle is overspeed, after the current vehicle-mounted terminal receives driving data of a vehicle-mounted terminal of the rear vehicle, calculating a relative position distance of the two vehicles in a safe time by the current vehicle-mounted terminal according to the positions, speeds and accelerations of the two vehicles, and judging whether influence is formed or not; if the influence is formed, sending warning of paying attention to the rear coming vehicle to the driver by the current vehicle-mounted terminal; and meanwhile, sending reminding information of paying attention to the front vehicle to the vehicle-mounted terminal of the rear vehicle by the current vehicle-mounted terminal; and in an accelerated running process of the current vehicle-mounted terminal, calculating a relative position distance of the two vehicles in a safe time by the current vehicle-mounted terminal according to the positions, speeds and accelerations of the two vehicles, and judging whether influence is formed or not; if the influence is formed, sending corresponding warning information to the driver through human-computer interaction; and meanwhile, reversely feeding back the warning information to a corresponding vehicle.

The steps of step (107) are:

receiving the communication addresses sent by the cloud server at set time intervals, and superimposing the received communication addresses into a self region block;

when a rear vehicle runs in front of the self vehicle, sending the communication addresses in the self region block to a vehicle-mounted terminal of a just overtaking vehicle by the current vehicle-mounted terminal; superimposing received communication address information of the region block into a self region block by the vehicle-mounted terminal of the just overtaking vehicle; and deleting communication addresses of terminals beyond a set distance to update the self region block;

when a front vehicle lags behind the self vehicle, sending the communication addresses of the self region block to a vehicle-mounted terminal of the lagging vehicle by the current vehicle-mounted terminal; superimposing the received communication addresses of the region block into a self region block by the vehicle-mounted terminal of the lagging vehicle; and deleting communication addresses of terminals beyond a set distance to update the self region block; and after the self vehicle receives communication addresses of region blocks transmitted from the vehicle overtaken by the self vehicle or the vehicle overtaking the self vehicle, superimposing the received region blocks into the self region block; and deleting communication addresses of terminals beyond a set distance to update the self region block so as to realize the superimposing implementation of data among three parties of the built region block of the current vehicle-mounted terminal, the region blocks transmitted by the surrounding vehicle-mounted terminals, and communication addresses transmitted by the cloud server.

The steps of step (108) are:

when a traffic accident occurs, performing comparison by the current vehicle-mounted terminal according to the position, speed and acceleration of the self vehicle and the positions, speeds and accelerations of the surrounding vehicle-mounted terminals; after region block network updating abnormality, vehicle-mounted terminal relative position relationship abnormality and vehicle-mounted terminal acceleration abnormality are discovered, defining the condition to be the traffic accident generated by the located vehicle of the current vehicle-mounted terminal; transmitting the position of the current vehicle-mounted terminal to the cloud server; and after the cloud server judges the condition to be the traffic accident, notifying information to a road administration or traffic police brigade server.

The steps of step (109) are:

when a traffic accident occurs, giving special passing permissions to road administration vehicles and ambulances; broadcasting positions, speeds and accelerations of vehicle-mounted terminals of the ambulances and the road administration vehicles to vehicle-mounted terminals in corresponding road sections by the cloud server; calculating the rest time for the road administration vehicles and the ambulances to reach by the vehicle-mounted terminals in the corresponding road sections; and adopting effective avoiding measures.

A traffic flow dynamic guiding method includes:

step (201): receiving positions, speeds, accelerations or directions sent by vehicle-mounted terminals by a cloud server; judging a driving danger coefficient of each vehicle by the cloud server according to self prestored road network data and safety reminding of corresponding positions; calculating an accident occurring probability of a current automobile in a set range of a current road section according to road conditions and vehicle conditions of corresponding road sections; and if the accident occurring probability exceeds a set threshold, feeding back danger warning to the vehicle-mounted terminals;

step (202): calculating surrounding vehicle-mounted terminals forming interference with the current vehicle-mounted terminal in a set time range by the cloud server according to the position, speed, acceleration or direction of the current vehicle-mounted terminal received by the cloud server; and sending communication addresses of the surrounding vehicle-mounted terminals forming the interference to the current vehicle-mounted terminal; and step (203): broadcasting a position of a traffic accident to all vehicle-mounted terminals along road sections influenced by the traffic accident by the cloud server; and reminding other vehicle-mounted terminals to slow down.

A cloud server includes a first processor. The first processor is respectively connected with a first memory and a first human-computer interaction module. The first processor is further connected with a vehicle-mounted terminal through a first communication module. A computer instruction is stored in the first memory. The computer instruction runs on the first processor. When the computer instruction runs on the first processor, the following steps are completed:

receiving positions, speeds, accelerations or directions sent by the vehicle-mounted terminals; judging a driving danger coefficient of each vehicle according to self prestored road network data and safety reminding of corresponding positions; calculating an accident occurring probability of a current automobile in a set range of a current road section according to road conditions and vehicle conditions of corresponding road sections; and if the accident occurring probability exceeds a set threshold, feeding back danger warning to the vehicle-mounted terminals;

calculating surrounding vehicle-mounted terminals forming interference with the current vehicle-mounted terminal in a set time range according to the received position, speed, acceleration or direction of the current vehicle-mounted terminal; sending communication addresses of the surrounding vehicle-mounted terminals forming the interference to the current vehicle-mounted terminal; and broadcasting a position of a traffic accident to all vehicle-mounted terminals along road sections influenced by the traffic accident, and reminding other vehicle-mounted terminals to slow down.

A vehicle-mounted terminal includes a second processor. The second processor is respectively connected with a positioning module, a second memory and a second human-computer interaction module. The second processor is further connected with a cloud server through a second communication module. A computer instruction is stored in the second memory. The computer instruction runs on the second processor. When the computer instruction runs on the second processor, the following steps are completed:

building communication connection with the cloud server; performing data acquisition, and uploading acquired data to the cloud server; receiving feedback of the cloud server, where the feedback includes an accident occurring probability of a current automobile in a set range of a current road section; after the accident occurring probability of the current automobile in the set range of the current road section is received, sending the probability to a driver in a human-computer interaction mode;

receiving communication addresses, sent by the cloud server, of the surrounding vehicle-mounted terminals in the set range, and building a connection relationship with the surrounding vehicle-mounted terminals through the communication addresses; and broadcasting a self position, speed, acceleration or driving behavior safety coefficient to the surrounding vehicle-mounted terminals, and identically, receiving driving data of the surrounding vehicle-mounted terminals.

Compared with the prior art, the present invention has the following beneficial effects:

After receiving current road section and forward accident probability information, the vehicle-mounted terminal transmits the information to the driver in a sound or image form to enable the driver to adopt a safety driving measure, and traffic flow dynamic guiding is further realized.

After receiving the communication addresses of the surrounding vehicle-mounted terminals, the current vehicle-mounted terminal issues the self position, speed and acceleration information to the surrounding vehicle-mounted terminals, and acquires the position, speed and acceleration information issued by the surrounding vehicle-mounted terminals at the same time. The vehicle-mounted terminal calculates a mutual position relationship and a possibly occurring position relationship in future, and judges whether the position, speed and acceleration information of the surrounding vehicle-mounted terminals generates a threat to the self or not. If a threat is generated, sound and video early warning will be generated through the human-computer interaction module so as to remind the driver of the current vehicle-mounted terminal to pay attention to the safety and to adopt a corresponding driving measure. If the vehicle-mounted terminal calculates that the influence will be generated on the surrounding vehicle-mounted terminals through the self position, speed and acceleration information, information will be emergently and intensively issued to the surrounding vehicle-mounted terminals to remind the surrounding vehicle-mounted terminals to pay attention to the safety and take corresponding driving measures.

Under cooperation of the cloud server and the vehicle-mounted terminals, the cooperative communication among the current vehicle-mounted terminal, the surrounding vehicle-mounted terminals and the cloud server is realized. The self safety is ensured. Early warning is realized on possible danger. The corresponding road saturation is told to each vehicle-mounted terminal in advance, so that the traffic is safer and more intelligent.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute an improper limitation to this application.

DETAILED DESCRIPTION

It should be noted that the following detailed descriptions are all exemplary and are intended to provide a further understanding of this application. Unless otherwise specified, all technical and scientific terms used herein have the same meaning as commonly understood by those of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Figure 1:
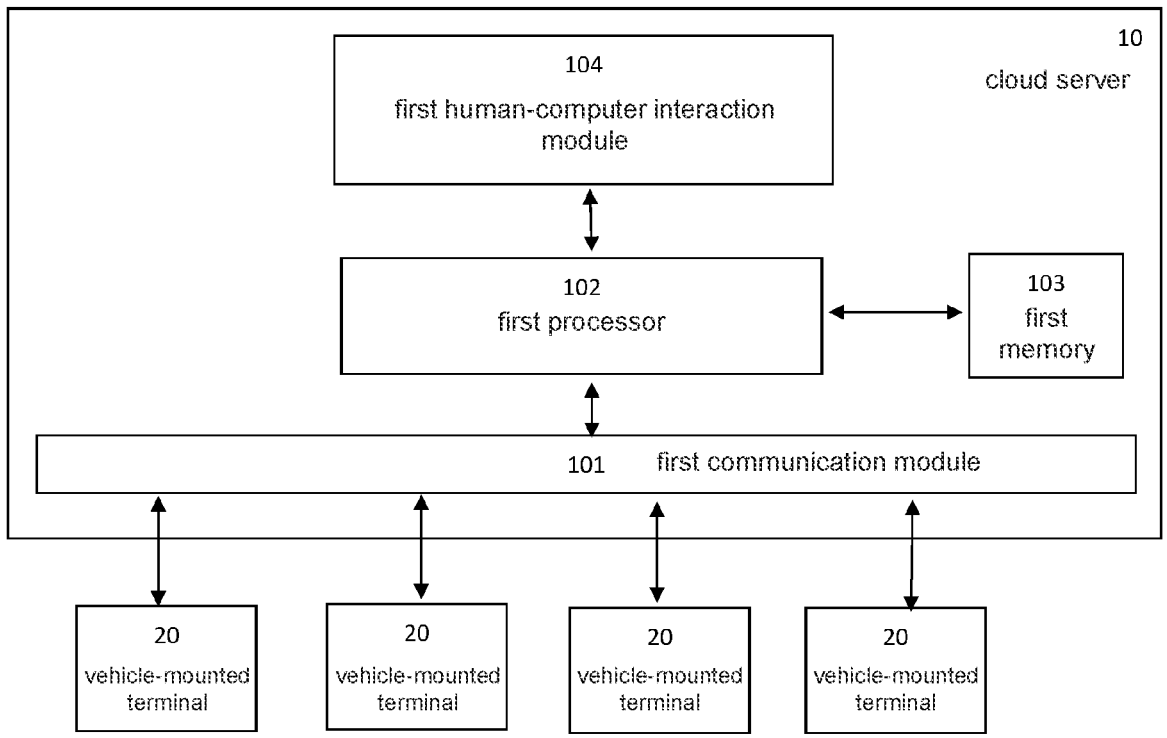
FIG. 1 is a structure diagram of a cloud server of the present invention.

As shown in FIG. 1, a traffic safety and organization system based on a region block technology of the present invention includes a cloud server 10 and vehicle-mounted terminals 20.

The cloud server includes a first communication module 101, a first processor 102, a first memory 103 and a first human-computer interaction module 104.

Wherein, the first communication module 101 is in charge of communication with each vehicle-mounted terminal, including sending of data and receiving of data sent by the vehicle-mounted terminals.

The first processor 102 processes the received data through a built-in processing program.

The first memory 103 is in charge of storing relevant information.

The first human-computer interaction module 104 is in charge of displaying the relevant information to relevant personnel.

Figure 2:
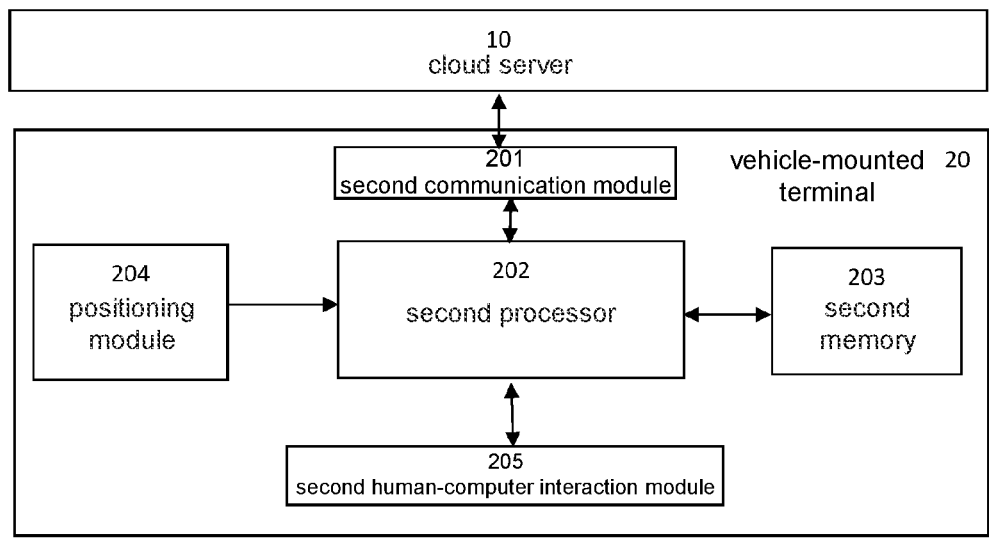
FIG. 2 is a structure diagram of a vehicle-mounted terminal of the present invention.

As shown in FIG. 2, the vehicle-mounted terminal 20 includes a second communication module 201, a second processor 202, a second memory 203, a positioning module 204 and a second human-computer interaction module 205.

Wherein, the second communication module 201 is in charge of communication with the cloud server.

The second processor 202 is in charge of processing self data, information received from the cloud server, information received from the self region block, and information received from drivers and passengers.

The second processor 203 is in charge of storing relevant information.

The positioning module 204 is in charge of performing real-time positioning in a time point or time interval instructed by the program, and transmitting positioning information to the second processor 202.

The second human-computer interaction module 205 is in charge of displaying the relevant information to relevant personnel.

A work method of the present invention is as follows:

A traffic flow dynamic guiding method based on a region block includes the following steps.

Step (101): A vehicle-mounted terminal builds communication connection with a cloud server.

Step (102): The vehicle-mounted terminal performs data acquisition, and uploads acquired data to the cloud server after processing.

Step (103): The vehicle-mounted terminal receives feedback of the cloud server. The feedback includes an accident occurring probability of a current automobile in a set range of a current road section.

Step (104): After receiving the accident occurring probability of the current automobile in the set range of the current road section, the vehicle-mounted terminal judges whether the probability exceeds a threshold or not. If the probability exceeds the threshold, the probability is sent to a driver in a human-computer interaction mode.

Step (105): A region block relationship is built. The current vehicle-mounted terminal receives communication addresses, sent by the cloud server, of the surrounding vehicle-mounted terminals in the set range. The current vehicle-mounted terminal builds a connection relationship with the surrounding vehicle-mounted terminals through the communication addresses.

Step (106): Running is performed after the region block relationship is built. The current vehicle-mounted terminal broadcasts a self position, speed, acceleration or driving behavior safety coefficient to the surrounding vehicle-mounted terminals, and identically, driving data of the surrounding vehicle-mounted terminals is also transmitted to the current vehicle-mounted terminal.

Step (107): The region block relationship is updated. After relative positions of the current vehicle-mounted terminal and the surrounding vehicle-mounted terminals are changed, the current vehicle-mounted terminal updates self driving data and the driving data of the surrounding vehicle-mounted terminals.

Step (108): Traffic flow guiding is performed on traffic accident information by using the region block relationship.

Step (109): Traffic flow guiding is performed on official vehicles by using the region block relationship.

The steps of step (101) are:

The vehicle-mounted terminal is started. The vehicle-mounted terminal builds the communication connection with the cloud server. The vehicle-mounted terminal sends a self communication address to the cloud server.

The steps of step (102) are:

After the vehicle-mounted terminal enters a road network, the vehicle-mounted terminal positions self position coordinates. The vehicle-mounted terminal calculates the self position, speed, acceleration or direction by using the position coordinates and time, and uploads data obtained through calculation to the cloud server.

The steps of step (105) are:

The vehicle-mounted terminal receives a driving danger coefficient of a current vehicle sent by the cloud server, and an accident occurring probability warning given according to a current driving speed, current road conditions or current vehicle conditions, and sends warning information to the driver in a human-computer interaction mode.

The steps of step (106) are:

In a running process of the current vehicle-mounted terminal at a normal speed, if a front vehicle decelerates, after receiving driving data of a vehicle-mounted terminal of the front vehicle, the current vehicle-mounted terminal calculates a relative position distance of the two vehicles in a safe time according to the positions, speeds and accelerations of the two vehicles, and judges whether influence is formed or not. If the influence is formed, the current vehicle-mounted terminal immediately transmits warning information to the driver, and meanwhile, sends the warning information to the vehicle-mounted terminal of the front vehicle. The vehicle-mounted terminal of the front vehicle transmits information obtained by self judgment and the received warning information to the self driver after combination.

In the running process of the current vehicle-mounted terminal at the normal speed, if the front vehicle changes lanes, after receiving driving data of the vehicle-mounted terminal of the front vehicle, the current vehicle-mounted terminal calculates a relative position distance of the two vehicles in a safe time according to the positions, speeds and accelerations of the two vehicles, and judges whether influence is formed or not. If the influence is formed, information of paying attention to lane change of the front vehicle is sent to the driver, and meanwhile, the current vehicle-mounted terminal sends reminding information of paying attention to safety driving to the vehicle-mounted terminal of the front vehicle.

In the running process of the current vehicle-mounted terminal at the normal speed, if a rear vehicle is overspeed, after receiving driving data of a vehicle-mounted terminal of the rear vehicle, the current vehicle-mounted terminal calculates a relative position distance of the two vehicles in a safe time according to the positions, speeds and accelerations of the two vehicles, and judges whether influence is formed or not. If the influence is formed, the current vehicle-mounted terminal sends warning of paying attention to the rear coming vehicle to the driver, and meanwhile, the current vehicle-mounted terminal sends reminding information of paying attention to the front vehicle to the vehicle-mounted terminal of the rear vehicle.

In an accelerated running process of the current vehicle-mounted terminal, the current vehicle-mounted terminal calculates a relative position distance of the two vehicles in a safe time according to the positions, speeds and accelerations of the two vehicles, and judges whether influence is formed or not. If the influence is formed, corresponding warning information is sent to the driver through human-computer interaction. Meanwhile, the warning information is reversely fed back to a corresponding vehicle.

The steps of step (107) are:

The communication addresses sent by the cloud server at set time intervals are received, and the received communication addresses are superimposed into a self region block.

When a rear vehicle runs in front of the self vehicle, the current vehicle-mounted terminal sends the communication addresses in the self region block to a vehicle-mounted terminal of a just overtaking vehicle. The vehicle-mounted terminal of the just overtaking vehicle superimposes received communication address information of the region block into a self region block, and deletes communication addresses of terminals beyond a set distance to update the self region block.

When a front vehicle lags behind the self vehicle, the current vehicle-mounted terminal sends the communication addresses of the self region block to a vehicle-mounted terminal of the lagging vehicle. The vehicle-mounted terminal of the lagging vehicle superimposes the received communication addresses of the region block into a self region block, and deletes communication addresses of terminals beyond a set distance to update the self region block.

After receiving communication addresses of region blocks transmitted from the vehicle overtaken by the self vehicle or the vehicle overtaking the self vehicle, the self vehicle superimposes the received region blocks into the self region block, and deletes communication addresses of terminals beyond a set distance to update the self region block so as to realize the superimposing implementation of data among three parties of the built region block of the current vehicle-mounted terminal, the region blocks transmitted by the surrounding vehicle-mounted terminals, and communication addresses transmitted by the cloud server.

The steps of step (108) are:

When a traffic accident occurs, the current vehicle-mounted terminal performs comparison according to the position, speed and acceleration of the self vehicle and the positions, speeds and accelerations of the surrounding vehicle-mounted terminals. After region block network updating abnormality, vehicle-mounted terminal relative position relationship abnormality and vehicle-mounted terminal acceleration abnormality are discovered, the condition is defined to be the traffic accident generated by the located vehicle of the current vehicle-mounted terminal. The position of the current vehicle-mounted terminal is transmitted to the cloud server. After the cloud server judges the condition to be the traffic accident, information is notified to a road administration or traffic police brigade server.

The steps of step (109) are:

When a traffic accident occurs, special passing permissions are given to road administration vehicles and ambulances. The cloud server broadcasts positions, speeds and accelerations of vehicle-mounted terminals of the ambulances and the road administration vehicles to vehicle-mounted terminals in corresponding road sections. The vehicle-mounted terminals in the corresponding road sections calculates the rest time for the road administration vehicles and the ambulances to reach, and adopts effective avoiding measures.

A traffic flow dynamic guiding method includes the following steps.

Step (201): A cloud server receives positions, speeds, accelerations or directions sent by vehicle-mounted terminals. The cloud server judges a driving danger coefficient of each vehicle according to self prestored road network data and safety reminding of corresponding positions, and calculates an accident occurring probability of a current automobile in a set range of a current road section according to road conditions and vehicle conditions of corresponding road sections. If the accident occurring probability exceeds a set threshold, danger warning is fed back to the vehicle-mounted terminals.

Step (202): The cloud server calculates surrounding vehicle-mounted terminals forming interference with the current vehicle-mounted terminal in a set time range according to the position, speed, acceleration or direction of the current vehicle-mounted terminal received by the cloud server, and sends communication addresses of the surrounding vehicle-mounted terminals forming the interference to the current vehicle-mounted terminal.

Step (203): The cloud server broadcasts a position of a traffic accident to all vehicle-mounted terminals along road sections influenced by the traffic accident, and reminds other vehicle-mounted terminals to slow down.

Figure 4:
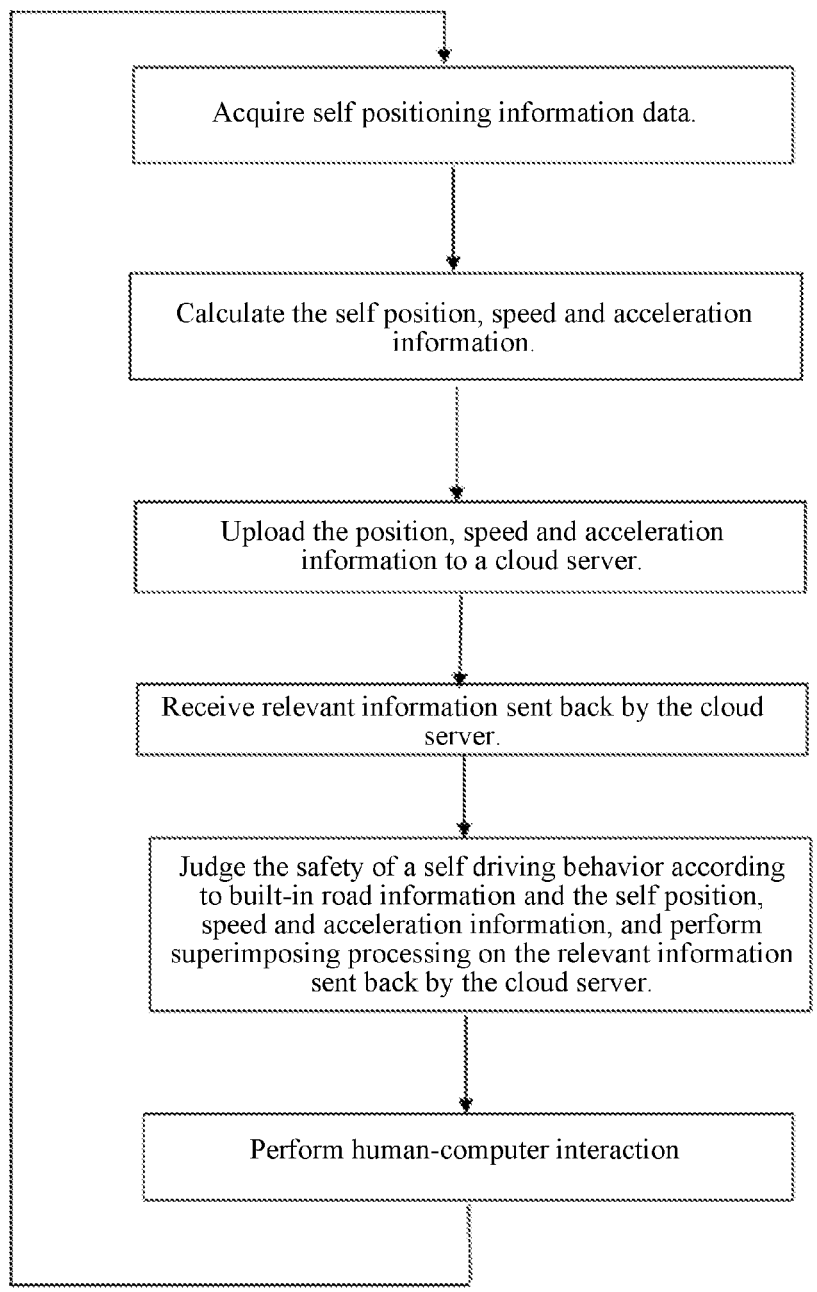
FIG. 4 is a self data processing flow diagram of the vehicle-mounted terminal of the present invention.

As shown in FIG. 4, after an automobile is started, the vehicle-mounted terminal is started. The positioning module 204 positions the self position, and sends the position information to the second processor 202. A processor module of the vehicle-mounted terminal calculates the self position, speed, acceleration and driving safety grade according to position and time information, and sends the information to the second memory 203 to be stored. The information is sent to the second communication module 201. The second communication module 201 sends the information to the could server.

Figure 3:
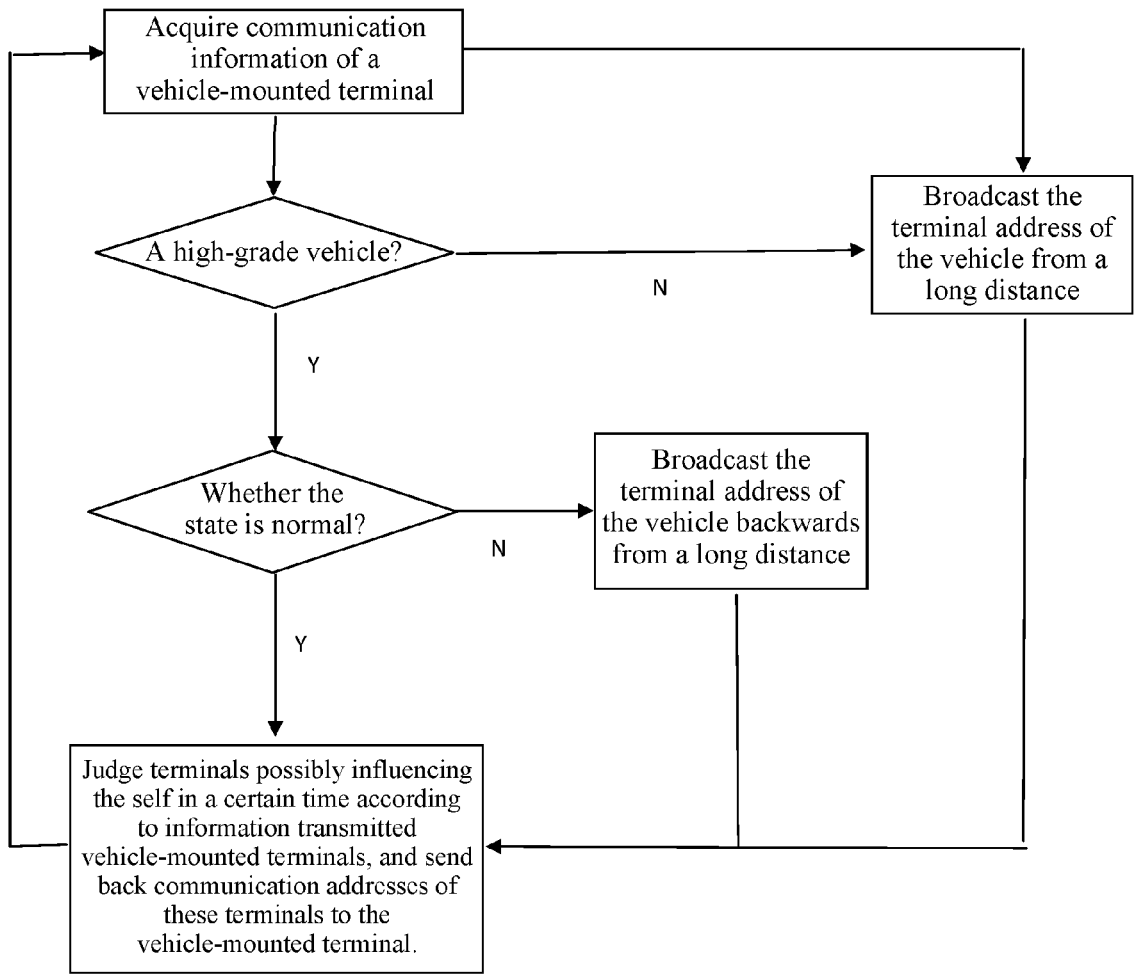
FIG. 3 is a data processing flow diagram of a cloud client of the present invention.

As shown in FIG. 3, after receiving automobile information, the cloud server judges whether the automobile is a high-grade vehicle or not. If the automobile is a high-grade vehicle (such as a police vehicle, an ambulance, a fire fighting truck or a road administration vehicle), information such as the position, speed, acceleration and driving safety grade of the high-grade vehicle is broadcast to corresponding vehicles along the road sections according to a default algorithm of the program to remind the corresponding vehicles to avoid. Then, whether the vehicle is in a traffic accident state or not or the quantity of the vehicles in the traffic accident state and the serious degree of the traffic accident are calculated according to a default algorithm of the cloud server, and corresponding information is timely fed back to a total command center through the first human-computer interaction module 104 for starting a contingency plan in the first time. Additionally, the cloud server calculates the quantity of front and rear vehicles capable of influencing the vehicle in a safe time, and sends the communication addresses of the vehicle-mounted terminals of these vehicles to the vehicle.

Figure 5:
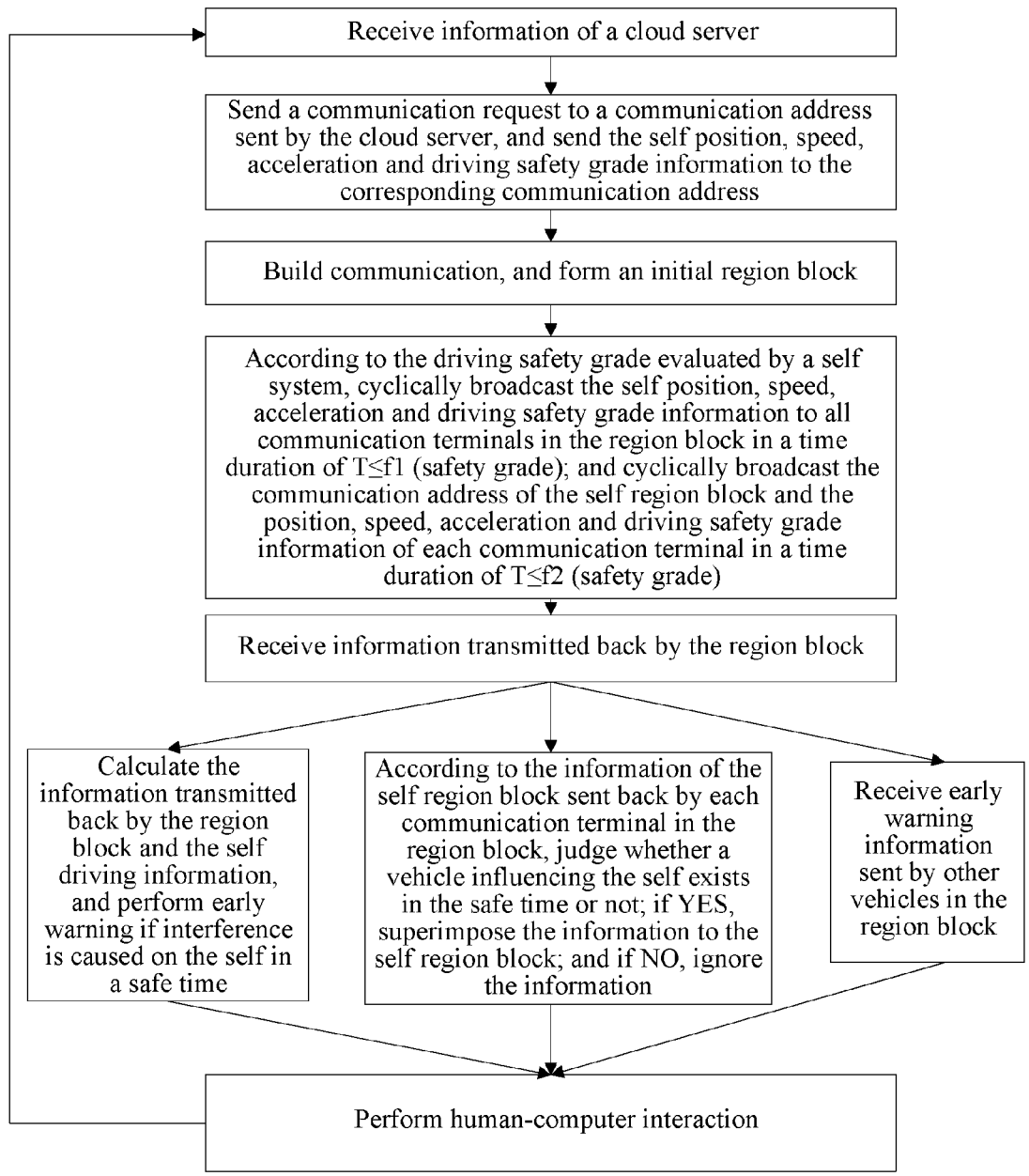
FIG. 5 is an information processing flow diagram of a region block of the vehicle-mounted terminal of the present invention.

As shown in FIG. 5, after receiving the information sent by the cloud server, the vehicle-mounted terminal does statistics on the communication addresses of the vehicle-mounted terminals of corresponding vehicles possibly influencing the self driving in the safe time in the information, and sends information to them to request connection building. After receiving requests, other vehicles perform judgment and build the connection to form an initial region block network.

The self position, speed, acceleration and driving safety grade information is cyclically broadcast to all communication terminals in the region block in a time duration of $T \le f1$ (safety grade). The acquired information of the positions, speeds, accelerations and driving safety grades of all communication terminals in the region block is processed. If a vehicle influencing the self is discovered, information, such as warning of "Pay attention to an overspeed vehicle at speed of 140 km/h in 100 m in a right rear side" and "Pay attention to a vehicle changing lanes in 100 m in front and slow down", is fed back to the driver and passenger through the human-computer interaction module of the vehicle-mounted terminal.

The communication address of the self region block and the position, speed, acceleration and driving safety grade information of each communication terminal are cyclically broadcast in a time duration of T≤f2 (safety grade). Meanwhile, the acquired corresponding information sent by other vehicles in the region block are processed. If the self will be influenced through calculation according to the position, speed and acceleration of the vehicles in a certain time, the communication address is superimposed into the self region block. If no influence is formed, the communication address is ignored.

If sensing the possibility of influencing the surrounding vehicles by the self in the running process, the self vehicle sends information to the corresponding vehicles to be influenced to remind them to pay attention to the safety. Meanwhile, the received information sent by other vehicles is also superimposed with warning information calculated by self software. The result is fed back to the driver and passenger through the human-computer interaction module of the vehicle-mounted terminal.

The foregoing descriptions are merely exemplary embodiments of this application, but are not intended to limit this application. A person skilled in the art may make various alterations and variations to this application. Any modification, equivalent replacement, or improvement made without departing from the spirit and principle of this application shall fall within the protection scope of this application.

What is claimed is:

1. A traffic flow dynamic guiding method based on a region block, comprising:
   step (101): building communication connection with a cloud server by a vehicle-mounted terminal provided in a self vehicle;
   step (102): performing data acquisition by the vehicle-mounted terminal, and uploading acquired data to the cloud server after processing;
   step (103): receiving feedback of the cloud server by the vehicle-mounted terminal, wherein the feedback comprises an accident occurring probability of a current automobile in a set range of a current road section;
   step (104): after the vehicle-mounted terminal receives the accident occurring probability of the current automobile in the set range of the current road section, judging whether the probability exceeds a threshold or not; if the probability exceeds the threshold, sending the probability to a driver of the self vehicle in a human-computer interaction mode;
   step (105): building a region block relationship: receiving communication addresses, sent by the cloud server, of surrounding vehicle-mounted terminals in the set range by a current vehicle-mounted terminal corresponding to the vehicle-mounted terminal, and building a connection relationship with the surrounding vehicle-mounted terminals through the communication addresses by the current vehicle-mounted terminal;
   step (106): performing running after the region block relationship is built: broadcasting a self position, speed, acceleration or driving behavior safety coefficient to the surrounding vehicle-mounted terminals by the current vehicle-mounted terminal, and also transmitting driving data of the surrounding vehicle-mounted terminals to the current vehicle-mounted terminal;
   step (107): updating the region block relationship: after relative positions of the current vehicle-mounted terminal and the surrounding vehicle-mounted terminals are changed, updating self driving data and the driving data of the surrounding vehicle-mounted terminals by the current vehicle-mounted terminal, wherein the steps of the step (107) are:
   receiving the communication addresses sent by the cloud server at set time intervals, and superimposing the received communication addresses into a self region block of the self vehicle;
   when a rear vehicle runs in front of the self vehicle to just overtake the self vehicle, sending the communication addresses in the self region block of the self vehicle to a vehicle-mounted terminal of the just overtaking vehicle by the current vehicle-mounted terminal; superimposing the received communication addresses of the region block relationship into a self region block by the vehicle-mounted terminal of the just overtaking vehicle; and deleting communication addresses of terminals beyond a set distance to update the self region block of the self vehicle;
   when a front vehicle lags behind the self vehicle, sending the communication addresses of the self region block of the self vehicle to a vehicle-mounted vehicle of the lagging vehicle by the current vehicle-mounted terminal; superimposing the received communication addresses of the region block relationship into a self region block by the vehicle-mounted terminal of the lagging vehicle, and deleting communication addresses of terminals beyond the set distance to update the self region block of the self vehicle; and
   after the self vehicle receives communication addresses of region blocks transmitted from the lagging vehicle or the vehicle overtaking the self vehicle, superimposing the received region blocks into the self region block of the self vehicle, and deleting communication addresses of terminals beyond the set distance to update the self region block of the self vehicle so as to realize a superimposing implementation of data among three parties of a built region block of the current vehicle-mounted terminal, the region blocks transmitted by surrounding vehicle-mounted terminals, and communication addresses transmitted by the cloud server;
   step (108): performing traffic flow guiding on traffic accident information by using the region block relationship; and
   step (109): performing traffic flow guiding on official vehicles by using the region block relationship, wherein the steps of the step (109) are:
   when a traffic accident occurs, giving special passing permissions to road administration vehicles and ambulances; broadcasting positions, speeds and accelerations of vehicle-mounted terminals of the ambulances and the road administration vehicles to vehicle-mounted terminals in corresponding road sections by the cloud server; calculating a rest time for the road administration vehicles and the ambulances to reach by the vehicle-mounted terminals in the corresponding road sections: and adopting effective avoiding measures.

2. The traffic flow dynamic guiding method based on a region block according to claim 1, wherein the steps of the step (101) are:

starting the vehicle-mounted terminal; building the communication connection with the cloud server by the vehicle-mounted terminal; and sending a self communication address to the cloud server by the vehicle-mounted terminal.

3. The traffic flow dynamic guiding method based on a region block according to claim 1, wherein the steps of the step (102) are:

after the vehicle-mounted terminal enters a road network, positioning self position coordinates by the vehicle-mounted terminal; calculating the self position, speed, acceleration or direction by the vehicle-mounted terminal by using the position coordinates and time; and uploading data obtained through calculation to the cloud server.

4. The traffic flow dynamic guiding method based on a region block according to claim 1, wherein the steps of the step (105) are:

receiving a driving danger coefficient of a current vehicle sent by the cloud server, and an accident occurring probability warning given according to a current driving speed, current road conditions or current vehicle conditions by the vehicle-mounted terminal; and sending warning information to the driver in a human-computer interaction mode.

5. The traffic flow dynamic guiding method based on a region block according to claim 1, wherein the steps of step (106) are:

in a running process of the current vehicle-mounted terminal at a normal speed, if the front vehicle decelerates, after the current vehicle-mounted terminal receives driving data of a vehicle-mounted terminal of the front vehicle, calculating a relative position distance of the two vehicles, corresponding to the self vehicle and the front vehicle, in a safe time by the current vehicle-mounted terminal according to positions, speeds and accelerations of the two vehicles, and judging whether influence is formed or not; if the influence is formed, immediately transmitting warning information to driver of the self vehicle by the current vehicle-mounted terminal; meanwhile, sending the warning information to the vehicle-mounted terminal of the front vehicle; and transmitting information obtained by self judgement and the received warning information to a driver of the front vehicle by the vehicle-mounted terminal of the front vehicle.

6. The traffic flow dynamic guiding method based on a region block according to claim 5, comprising:

in the running process of the current vehicle-mounted terminal at the normal speed, if the front vehicle changes lanes, after the current vehicle-mounted terminal receives driving data of the vehicle-mounted terminal of the front vehicle, calculating a relative position distance of the two vehicles in a safe time by the current vehicle-mounted terminal according to the positions, speeds and accelerations of the two vehicles, and judging whether influence is formed or not; if the influence is formed, sending information of paying attention to lane change of the front vehicle to the driver of the self vehicle; and meanwhile, sending reminding information of paying attention to safety driving to the vehicle-mounted terminal of the front vehicle by the current vehicle-mounted terminal.

7. The traffic flow dynamic guiding method based on a region block according to claim 5, comprising:

in the running process of the current vehicle-mounted terminal at the normal speed, if the rear vehicle is overspeed, after the current vehicle-mounted terminal receives driving data of a vehicle-mounted terminal of the rear vehicle, calculating a relative position distance of the two vehicles, corresponding to the self vehicle and the rear vehicle, in a safe time by the current vehicle-mounted terminal according to positions, speeds and accelerations of the self vehicle and the rear vehicle, and judging whether influence is formed or not; if the influence is formed, sending warning of paying attention to the rear vehicle to the driver of the self vehicle by the current vehicle-mounted terminal; and meanwhile, sending reminding information of paying attention to the front vehicle to the vehicle-mounted terminal of the rear vehicle by the current vehicle-mounted terminal; and in an accelerated running process of the current vehicle-mounted terminal, calculating a relative position distance of the self vehicle and the rear vehicle in a safe time by the current vehicle-mounted terminal according to the positions, speeds and accelerations of the self vehicle and the rear vehicle, and judging whether influence is formed or not; if the influence is formed, sending corresponding warning information to the driver of the self vehicle through human-computer interaction; and meanwhile, reversely feeding back the warning information to rear vehicle.

8. The traffic flow dynamic guiding method based on a region block according to claim 1, wherein the steps of the step (108) are:

when the traffic accident occurs, performing comparison by the current vehicle-mounted terminal according to the position, speed and acceleration of the self vehicle and the positions, speeds and accelerations of the surrounding vehicle-mounted terminals; an after region block network updating abnormality, a vehicle-mounted terminal relative position relationship abnormality and a vehicle-mounted terminal acceleration abnormality are discovered, defining a condition to be the traffic accident generated by a located vehicle by the current vehicle-mounted terminal; transmitting the position of the current vehicle-mounted terminal to the cloud server; and after the cloud server judges the condition to be the traffic accident, notifying information to a road administration or traffic police brigade server.

* * * * *